(No Model.)
J. NELSON.
POISON DISTRIBUTER.
No. 392,631. Patented Nov. 13, 1888.
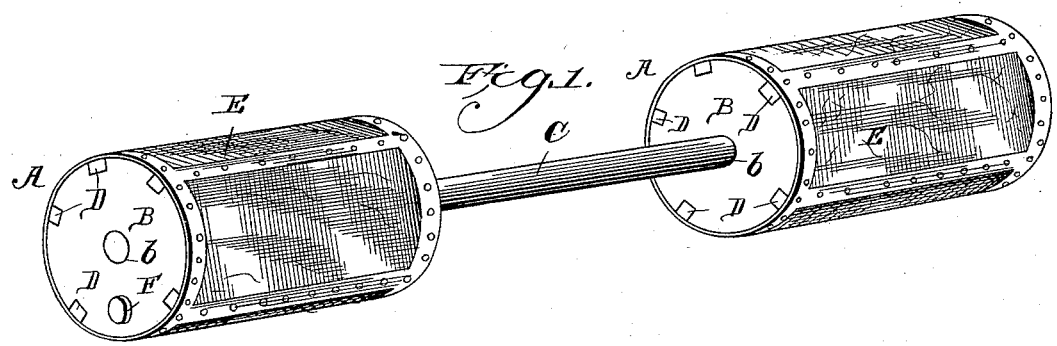
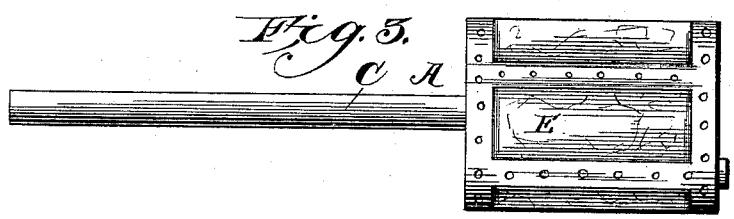
Witnesses.
Henry G. Dieterich
Theodore S. West
Inventor,
John Nelson,
By his Attorneys
C. A. Knowles.

United States Patent Office.

JOHN NELSON, OF LEXINGTON, KENTUCKY.

POISON-DISTRIBUTER.

SPECIFICATION forming part of Letters Patent No. 392,631, dated November 13, 1888.

Application filed June 5, 1888. Serial No. 276,122. (No model.)

*To all whom it may concern:*

Be it known that I, JOHN NELSON, a citizen of the United States, residing at Lexington, in the county of Fayette and State of Kentucky, have invented a new and useful Improvement in Poison-Distributers, of which the following is a specification.

The invention relates to improvements in distributers of paris-green and similar poisonous materials used to destroy worms and bugs that infest and devastate crops; and it consists in the construction and novel combination of parts hereinafter described, illustrated in the accompanying drawings, and pointed out in the appended claims.

Figure 1 of the drawings represents a perspective view of the device mounted on a pole or shaft. Fig. 2 represents a central vertical longitudinal section thereof. Fig. 3 represents a modification in which the reel is attached to one end only of the pole.

Referring to the drawings by letter, A designates the frame of the device or reel composed of the end disks, B B, each having a central circular opening, $b$, by means of which the device may be mounted on a shaft, C, on one or both ends thereof. The said end disks are connected by the longitudinal slats D, which are preferably equidistant and are secured edgewise to the disks.

E is a cloth, similar to a bolting-cloth, and secured at its edges upon the peripheries of the end disks, B, as shown. The said cloth is stretched tightly between the slats D, so that its web is open and will permit the contained material to sift therethrough. The cloth, to prevent unequal stretching, is tacked or otherwise secured to the outer surfaces of the slats D. Each end disk is provided with an opening, F, through which the reel may be supplied with material when mounted on the shaft C.

G G are lead balls, preferably buckshot, inserted in the reel with the poisonous material contained therein.

In operation, when the reel is rotated, the shot fall from one slat to the next below, and, having more weight than the paris-green or other contained material, force the same through the web of the cloth and distribute it evenly over the ground.

In operation the middle of the plate is held across the pommel of the saddle, and the rider, as the horse progresses, rotates said pole or shaft with his hands. This is when there is a reel at both ends.

When there is a reel at one end only, the pole or shaft is held on the rider's shoulder with the reel or drum behind the horse, the rider turning the pole in front of his shoulder.

Having described my invention, I claim—

1. A poison-distributer consisting of a pole that can be held and rotated by a person on horseback and attached to the end of said pole, a poison-receptacle composed of end disks perforated centrally and secured upon the pole, equidistant slats connecting said disks, a suitable covering-cloth having its end edges secured to the peripheries of the disks and stretched between and secured to the outer surfaces of the slots, so that its web will be open, and the loose balls G, rolling freely in the receptacles A and driving the contained material through the cloths E, substantially as specified.

2. A poison-distributer composed of a pole having attached to its ends similar poison-receptacles, each composed of the disks B, perforated centrally and secured upon the pole, each end disk having a filling-opening, F, stopped by a suitable plug, the slats D, connecting the disks of each receptacle, and the cloths E, covering the receptacles, with their end edges secured to the peripheries of the disk, and the loose balls G, the said distributer being adapted to be balanced at the center of its pole upon the pommel of a saddle and to be rotated by the hands of the rider, substantially as specified.

3. The herein-described poison-distributer, composed of the pole C, the receptacles A, attached to the ends of said pole, and each composed of the end disks, B, the outer ones provided with plug-stopped openings F, the connecting-slats D, and the covering-cloth E, and the loose balls G, rolling freely in said receptacles with the material contained therein, substantially as specified.

In testimony that I claim the foregoing as my own I have hereto affixed my signature in presence of two witnesses.

JOHN NELSON.

Witnesses:
 WATTS PARKER,
 GEO. T. CRESS.